H. H. STONER.
ARMORED TIRE.
APPLICATION FILED MAY 15, 1918.

1,296,441.

Patented Mar. 4, 1919.
2 SHEETS—SHEET 1.

Inventor
Harvey H. Stoner,
By
Attorney

H. H. STONER.
ARMORED TIRE.
APPLICATION FILED MAY 15, 1918.
1,296,441.
Patented Mar. 4, 1919.
2 SHEETS—SHEET 2.
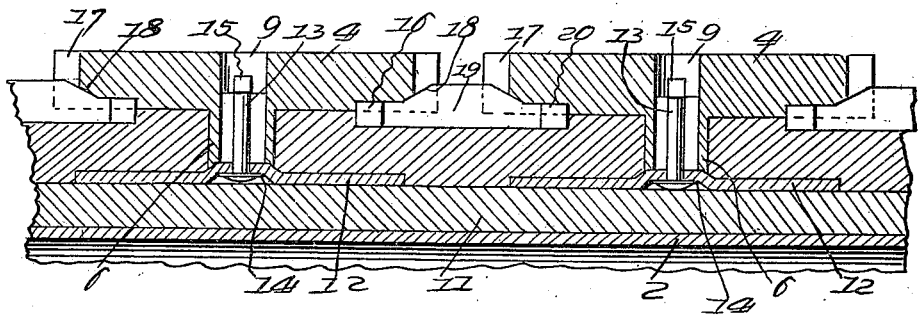
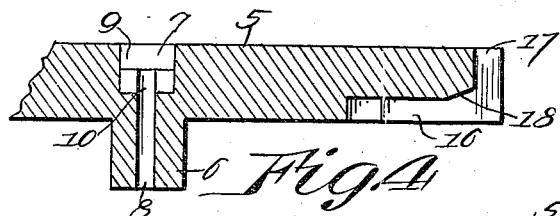
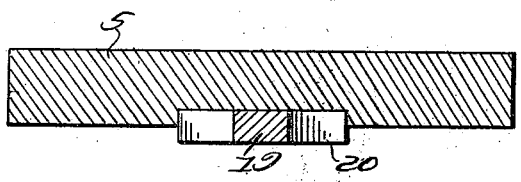
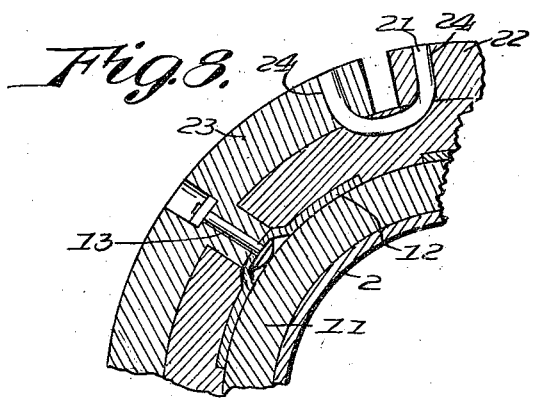
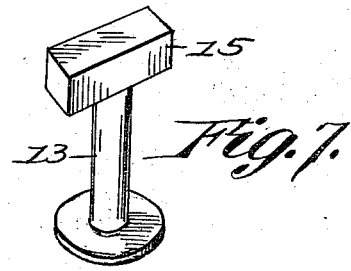
Inventor
Harvey H. Stoner,
By
Attorney

UNITED STATES PATENT OFFICE.

HARVEY H. STONER, OF SPRINGFIELD, OHIO, ASSIGNOR OF ONE-HALF TO WILLIS D. STONER, OF SPRINGFIELD, OHIO.

ARMORED TIRE.

1,296,441.   Specification of Letters Patent.   Patented Mar. 4, 1919.

Application filed May 15, 1918. Serial No. 234,645.

*To all whom it may concern:*

Be it known that I, HARVEY H. STONER, a citizen of the United States, residing at Springfield, in the county of Clark and State of Ohio, have invented new and useful Improvements in Armored Tires, of which the following is a specification.

As its principal object, the invention seeks to provide a flexible, metallic armor or structure for tires, so constructed as to entirely cover the tread and side portions of the tire without interfering with the yielding of the tire when subjected to pressure.

A further object of the invention resides in the new and novel means by which the armor is attached to the tire and the means for interconnecting the numerous sections comprising the armor.

A still further object is to provide an armor of this character in which a damaged or worn section may be easily replaced.

Still further and other objects appear hereinafter.

A specific embodiment has been adhered to in illustrating and describing the invention, but to this embodiment the said invention is not to be restricted. The right is reserved to vary the details of construction in any way suggested by the demands of practice, provided such variations in construction are comprehended in spirit by the subjoined claims.

In the accompanying drawings:

Figure 1 is a side elevation of a segment of an auto vehicle tire showing the improved armor attached thereto, Fig. 2 is a section on the line 2—2 of Fig. 1, Fig. 3 is a section on the line 3—3 of Fig. 2, Fig. 4 is a longitudinal sectional view through one of the sections comprising the armor, Fig. 5 is a detail sectional view of the structure in Fig. 4, but taken at right angles to the latter, Fig. 6 is a perspective view of one of the members employed for connecting adjacent sections together, Fig. 7 is a perspective view of one of the members used for connecting the armor and the tire, Fig. 8 is a detail sectional view showing a modified form of interconnecting the sections, Fig. 9 is a perspective view of the modified connecting means.

As illustrated, the invention is shown as applied to the outer tubing of an auto vehicle tire, the tire engaging rim 1, and the inner tube 2 being of the conventional form and the outer tube 3 being of the conventional form in so far as the means for mounting it on the rim 1 is concerned. The outer tube 3, however, is modified in construction to permit of the application of the improved armor.

This improved armor comprises the tread plates 4 and the side plates 5, all of which are connected to the tire in the same way, thus the description of the means of connecting any one to the tire will suffice to convey an intelligent idea of how the whole set are connected to the tire. The tread plates 4, because of the greater wear imposed upon them are thicker than are the side plates 5. The latter, however, at the edges adjoining the tread plates, are of the same thickness as the tread plates, but the other edges, that is, the edges nearest the rim 1 are very much reduced in thickness, since no wear will be imposed upon them, except such wear as is entailed by running the tires close to a curbing where they might be scraped and damaged were it not for the improved armor.

The tread plates are formed to conform to the transverse and circumferential shape of the tire 3 and each plate connects with the side plate 5 on either side of it and with the tread plates immediately preceding and succeeding it. It is formed on the end face at the center thereof with a boss 6 which rests in a depression formed in the tread of the outer tube 3, and the outer face of this tread plate directly in alinement with the center of the boss, has formed therein the circular depression 7. A hole 8 extends from the bottom of the depression 7 through the center of the boss 6. This hole 8 is of much less diameter than the depression 7, but on diametrically opposite sides, it is formed with the longitudinal recesses 9, the bottoms of which are in alinement with the circular side walls of the depression 7. The depression 7 on the bottom, on diametrically opposite sides of the hole 8 and at points ninety degrees from the recesses 9 has formed therein, the recesses 10. These recesses 10 and the recesses 9 are provided for the purpose of permitting the engagement of the tread plate 4 by a locking means which secures the plate to the tire, this locking means being described in detail hereinafter.
The outer tubing 3 on the inside and behind all that portion on which the plates 4 and 5 rest is cut away in order that there may be received in this cut away portion a rubber mat 11, this rubber mat resting against the inner tube 2, as shown in Fig. 2 of the drawings. Between the mat 11 and the adjacent inner faces of the tubing 3 there are carried the plates 12, one for each of the tread plates 4 and one for each of the side plates 5. A stud 13 has one end loosely passing through the plate 12 at the center of the latter and on that face of the said plate which joins the mat 11 there is attached a washer 14. The portion of the stud 13 which passes through the plate 12 is reduced in diameter over the major portion of the stud and the washer 14 is riveted on the end of this reduced portion, the major portion of this stud acting as a shoulder which abuts the plate 12. The plate 12 is so formed that the washer 14 may lie flush with that face against which it rests, so that the plate and washer may bear equally upon the mat 11.
Since the stud 13 loosely connects with the plate 12 provision is made for angular movement of the stud and the particular design herein shown calls for a cross piece 15 formed at that end of the stud remote from the plate. This cross piece 15 is so dimensioned that it may slide through the recesses 9 when the stud is slid through the hole 8, the stud and the hole being so dimensioned as to permit of this. Thus it will be seen that, if the cross piece 15 is turned to aline with the recesses 9, the plate 4 may be connected with the stud by passing the latter through the hole 8. The stud, however, is of a length that will bring the transverse piece 15 on the bottom of the depression 7 when the method of attachment as just described is effected. The turning of the transverse piece through an angle of ninety degrees will bring the latter in a position where it may drop in the recesses 10, when the plate 4 and plate 12 will be connected by means of the stud 13, those parts of the tubing 3 intervening between the two plates providing enough resiliency to keep the transveres piece 15 in the recesses 10. The turning of the stud 13 and its cross piece 15 to engage the latter in the recesses 10 may be effected by a suitable wrench attachable to the cross piece 15.
Each of the tread plates 4 and each of the side plates 5 is connected to the tubing 3 in this manner, and all of the associated plates 12 contact with and bear upon the mat 11.

The particular means for connecting the tread plates one to the other, the side plates 5 one to the other and the side plates 5 to the tread plates 4, in the preferred embodiment of the invention, or what at present, is felt to be the preferred embodiment, are in the form of joggle joint connections. This joggle joint connection calls for a T-shaped depression 16 formed in the under face of each plate at the center of the edge where it adjoins any other plate. This means that each tread plate 4 has one of these depressions formed at the middle of its two side edges and at the middle of its two end edges; the side plates of course, having these depressions formed in the middle of the thicker side edges and in the middle of the end edges, but not on the thinner edges, since these side plates 5 do not connect with anything at their thinner edges. The T-shaped depression 16 communicates with the transverse slot 17 opening onto the edge of the plate and all of the edges of all of the plates onto which these slots 17 open are beveled as shown at 18, the beveled edges 18 being formed on the inner and not on the outer faces of the plates as shown. The joggle joint connector is in the form of a bar 19 having an upstanding protuberance of the shape of an isosceles trapezoid in elevation whose inclined sides rest against the beveled edges of the two adjacent plates between which it is inserted. The bar 19 is provided at either end with a T-shaped extension 20 the two of which engage in the T-shaped depressions 16 of adjacent plates. It will be observed that this arrangement provides for the interconnecting of the several plates and also makes for a continuous metallic shield which is yieldable at any point exposed to excessive pressure.

One of the modifications shown contemplates the replacing of the joggle joint with a link connection in the form of a U-shaped member 21. With the use of this U-shaped member, the tread plates 22 and side plates 23 are made precisely like the plates 3 and 4 with the exception that the adjoining bevel edges of adjacent plates contact with each other, and that the plates have omitted therefrom, the T-shaped depressions 16 and slots 17, the place of the latter being taken by transverse holes 24 in which the legs of the U-shaped members engage, as clearly shown in Figs. 8 and 9.

It is believed that the accompanying drawings together with the foregoing description make the construction and operation of the invention clearly apparent, and further description is therefore omitted.

What is claimed is:

1. An armored tire comprising a casing, a plurality of plates distributed over the tread and sides of the casing, means for attaching the plates to the casing, and joggle joint connectors connecting the plates serially and transversely.

2. An armored tire comprising a casing, tread plates and side plates distributed over the outer surface of the casing, the said plates having formed on their inner faces bosses provided with central holes therethrough, the plates having circular depressions formed on their outer faces concentric with the holes and the holes being slotted on diametrically opposite sides, plates interior to the casing, studs pivotally attached to said interior plates and provided at the ends remote from the said plates with cross members, the said studs projecting through the said holes to permit the cross pieces to seat on the bottoms of the said depressions, an inner tube carried by the casing and a mat on the interior of the casing and interposed between the inner tube and the interior plates.

3. An armored tire comprising a casing, tread plates and side plates distributed over the outer surface of the casing, the said plates having formed on their inner faces bosses provided with central holes therethrough, the plates having circular depressions formed on their outer faces concentric with the holes and the holes being slotted on diametrically opposite sides, plates interior to the casing, and studs pivotally attached to said interior plates and provided at the ends remote from the said plates with cross members, the said studs projecting through the said holes to permit the cross pieces to seat on the bottoms of the said depressions.

4. An armored tire comprising a casing, tread plates and side plates distributed over the outer surface of the casing, the said plates having formed on their inner faces bosses provided with central holes therethrough, the plates having circular depressions formed on their outer faces concentric with the holes and the holes being slotted on diametrically opposite sides, plates interior to the casing, studs pivotally attached to said interior plates and provided at the ends remote from said plates with cross members, the said studs projecting through the said holes to permit the cross pieces to seat on the bottoms of the said depressions, and means interconnecting the tread plates and side plates serially and transversely.

5. An armored tire comprising a casing, a plurality of plates distributed over the tread and sides of the casing, means for attaching the plates to the casing, each plate where it has an edge adjoining another plate being formed with a T-shaped depression in its inner face, the plates having those edges adjoining another plate beveled beneath the outer faces, and bars having protuberances of the shape of an isosceles trapezoid and interposed between the edges of adjacent plates so that their inclined sides will abut the beveled edges of the plates, the said bars being formed with T-shaped projecting members engaging in the T-shaped depressions of the plates.

6. An armored tire comprising a resilient casing, armor plates carried on the exterior of the casing, and means whereby the said plates are detachably secured to the casing so that the resiliency of the casing holds them in attached position.

7. An armored tire comprising a resilient casing, plates carried on the exterior of the casing, other plates carried on the interior of the casing, and locking means attaching the exterior plates to the interior plates whereby the resiliency of the casing holds the said plates in attached position.

8. An armored tire comprising a resilient casing, armor plates carried on the exterior of the casing, means whereby the said plates are detachably secured to the casing so that the resiliency of the latter holds them in attached position, and further means interconnecting adjacent plates, the last said means being held in position by the said plates when the latter are in attached position.

9. An armored tire comprising a resilient casing, plates carried on the exterior of the casing, plates carried interior to the casing, means interconnecting adjacent exterior plates, and locking means attaching the exterior plates to the interior plates whereby the resiliency of the casing holds the said plates in attached position and the interconnecting means thereby held in attached position.

10. An armored tire comprising a resilient casing, a plurality of plates distributed over the tread and sides of the casing, means detachably securing the plates to the casing so that the resiliency of the latter retains them in attached position, and joggle joint connectors interconnecting adjacent plates and held in position when the plates are in attached position.

In testimony whereof I affix my signature.

HARVEY H. STONER.